(12) United States Patent
Öhman

(10) Patent No.: US 8,751,680 B2
(45) Date of Patent: Jun. 10, 2014

(54) APPARATUS, METHOD AND COMPUTER PROGRAM FOR SEAMLESS SESSION TRANSFER

(75) Inventor: Peter Öhman, Enebyberg (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 1323 days.

(21) Appl. No.: 12/096,659

(22) PCT Filed: Dec. 9, 2005

(86) PCT No.: PCT/SE2005/001881
§ 371 (c)(1),
(2), (4) Date: Jun. 9, 2008

(87) PCT Pub. No.: WO2007/067109
PCT Pub. Date: Jun. 14, 2007

(65) Prior Publication Data
US 2008/0298307 A1    Dec. 4, 2008

(51) Int. Cl.
*G06F 15/16* (2006.01)
*H04L 12/66* (2006.01)
*H04L 12/56* (2006.01)

(52) U.S. Cl.
CPC ............................... *H04L 49/25* (2013.01)
USPC ........................ 709/232; 709/219; 370/355

(58) Field of Classification Search
USPC ......................................................... 370/331
See application file for complete search history.

(56) References Cited

U.S. PATENT DOCUMENTS

| | | | |
|---|---|---|---|
| 6,859,448 B1 * | 2/2005 | Roy | 370/338 |
| 2003/0095540 A1 * | 5/2003 | Mulligan et al. | 370/352 |
| 2006/0233135 A1 * | 10/2006 | Oswal et al. | 370/331 |
| 2006/0256751 A1 * | 11/2006 | Jagadeesan et al. | 370/331 |
| 2007/0008951 A1 * | 1/2007 | Naqvi et al. | 370/352 |
| 2007/0159976 A1 * | 7/2007 | Dekeyzer et al. | 370/236 |
| 2008/0003988 A1 * | 1/2008 | Richardson | 455/414.3 |

OTHER PUBLICATIONS

Ohta K. et al. Adaptive terminal middleware for session mobility PUB-Proceedings 23rd International Conference on Distributed Computing Systems Workshops May 19-22, 2003 IRN-ISBN-0-7695-1921-0 (C) INSPEC/IEE 3.1-3.2 abstract.

Shacham R. et al. The virtual device: expanding wireless communication services through service discovery and session mobility 2005 IEEE International Conference on Wireless and Mobile Computing, Networking and Communications. IEEE WiMob 2005-22-24 Aug. 2005 ISBN 0-7803-9181-0 p. 73-81 vol. 4 abstract.

3GPP, 3rd Generation Partnership Project; Technical Specification Group Services and System Aspects; IP Multimedia Subsystem (IMS); Stage 2 (Release 7) 3GPP TS 23.228 v7.1.0. (Sep. 2005).

Peng. SSIP: Split a SIP Session over Multiple Devices. Institute of Communications Engineering. Jun. 2005.

\* cited by examiner

*Primary Examiner* — Shaq Taha

(57) ABSTRACT

An apparatus and method in a telecommunication system for controlling communication services between client terminals in a network. An application server hosting a core communication service communicates with the client terminals through an intermediate communication node in the network. The client terminals may be mobile terminals and the intermediate node may be a proxy call/session control function (P-CSCF) or a SIP application server (SIP-AS). A controller such as an IMS client controls transfer of communication sessions between the mobile terminals. The IMS client is divided into at least two parts, with one of the parts residing in the mobile terminal and the other part residing in the network.

11 Claims, 5 Drawing Sheets

APPARATUS, METHOD AND COMPUTER PROGRAM FOR SEAMLESS SESSION TRANSFER

TECHNICAL FIELD OF THE INVENTION

The present invention generally relates to an apparatus, method and computer program for transferring communication sessions between different terminals. More in detail, the invention relates to seamless transfer of IMS sessions between terminals, where IMS is an acronym for IP Multimedia Subsystem.

BACKGROUND OF THE INVENTION

In modern communications technology, the various possibilities for communication involve not only voice and data transmission, but also images and video. This has increased the demands on all communication devices, in particular the demands on terminals.

A user of modern communication devices normally changes from one specific device, specialised in a certain type of communication technology, to another for a different type of communication. An example of the above is that a mobile communication terminal is used when there is no fixed terminal is available and a video conference call requires another terminal. However, in a near future, it is expected that one single terminal will be able to handle most of the different kinds of technology for communication, including voice, data, images and video communication. In addition to that, there is a conception of converging technologies in the field of mobile communication between the interrelated fields of telecommunication and data communication.

If an established communication session in a certain technology can no longer be upheld, if for example the network does not support the technology when a user leaves an area of coverage, there is a still need for continuing communication, for example by means of a parallel communication technology. However, ever since the introduction and initial definition of intelligent end devices, the device was seen as a non-replaceable node in the communication chain, as important session data was stored in the end device. Also within the specific technical field of IMS, this approach is continuing.

The published US patent application US 2005/0238002 discloses an IP Multimedia Subsystem architecture for multimedia services for handling of various procedures relating to IMS sessions. With respect to the present invention, the disclosure is directed towards an ability handling different generations of communication terminals resulting in enhanced compatibility. However, the compatibility disclosed is merely intended to handle a variety of communication terminals of the same kind, possibly of generations with different versions of for instance software packets installed.

Hence, it can be concluded that presently known technologies relating to IMS do not support session data being stored in a way that the terminal. A solution to the technological problem of allowing for a replaceable terminal, possibly of another kind and in particular an IMS client, is sought.

SUMMARY OF THE INVENTION

It is therefore an object of the present invention to alleviate the previously mentioned disadvantages with reduced mobility as a result of using the mobile telecommunication terminal as the means for hosting the IMS client. This object is accomplished by an apparatus, method and related computer program in a telecommunication system for controlling communication services between client terminals in a network, comprising at least one application server hosting a core communication service, at least one intermediate communication node, hosting a network residing communication part for communication with the client terminals, the application server and intermediate communication node being adapted to seamlessly control transfer of communication sessions between the client terminals, characterised in that a controller is provided for controlling transfer of communication sessions between the terminals is divided into at least two parts, one of the parts residing in the client terminal, such as mobile telecommunication terminal, and another part residing in the intermediate communication node.

The present invention including the seamless IMS session transfer will eventually be operable with any communication network (fixed, mobile or wireless) with packet-switching functions, and the present communication systems will be supported through gateways. Open interfaces between control and service layers allow elements and calls/sessions from different access networks to be mixed arbitrarily. The present invention also allows operators and service providers to use different underlying network architectures. The mobile network provides terminal mobility (roaming), while user mobility is provided by IMS and a session initiation protocol (SIP). Other conceivable IP-based services made possible are that IMS will make it easier to offer various services including voice over IP (VOIP), push-to-talk over cellular (POC), multiparty gaming, videoconferencing and content sharing.

The IP Multimedia Core Network Subsystem in accordance with the present invention is a collection of different functions, linked by standardised interfaces. A function does not necessarily have to be within a node and an implementing parties may freely combine two functions in one single node, or to split a single function into two or more nodes. Moreover, one of the clear benefits leading to the effect if the invention is that each node may be present multiple times in a network, let alone for for load balancing or organisational issues.

The user is able to connect to an IMS network according to the present invention using various methods, all of which utilise the standardised Internet Protocol (IP). Direct terminals with IMS equipment (mobile phones, PDAs, computers, etc) can register directly into an IMS network, even when they are currently located so as to be roaming in another network than a domestic network or home network.

The advantages of an IMS systems according to the present invention over existing systems are numerous. The core network is independent of a particular access technology. Integrated mobility for all network applications. Easier migration of applications from fixed to mobile users. Faster deployment of new services based on standardised architecture. New applications such as presence information and videoconferencing. Evolution to combinational services, for example by combining instant messaging and voice. User profiles are stored in a central location.

BRIEF DESCRIPTION OF THE DRAWINGS

The features, objects, and further advantages of this invention will become apparent by reading this description in conjunction with the accompanying drawings, in which like reference numerals refer to like elements and in which.

DETAILED DESCRIPTION

The following description is of the best mode presently contemplated for practising the invention. The description is not intended to be taken in a limiting sense, but is made merely for the purpose of describing the general principles of the invention. The scope of the invention should only be ascertained with reference to the issued claims.

The present invention is applicable for use with all types of mobile networks including $2^{nd}$ and $3^{rd}$ generations of GSM (Global System for Mobile Communications) networks, transit networks such as Internet, Intranets, local area networks (LANs) and ATM based transit networks, and terminating networks such as public switched telephone networks (PSTNs) and ISDNs.

For example, $3^{rd}$ generation GSM networks including data networks using General Packet Radio Service (GPRS) technology for mobile data networking services and IP multimedia services, and Enhanced Data Rates for Global Evolution (EDGE) technology for high bit rate data services. However, for the sake of simplicity, discussions will be generalised to any type of mobile communication network for providing IP multimedia services.

The IP Multimedia Subsystem (IMS) is an open, standardised, operator friendly, Next Generation Networking (NGN) multi-media architecture for mobile and fixed IP services. It is a VoIP implementation based on a 3GPP variant of SIP, and runs over the standard Internet protocol (IP). It is used by telecom operators in NGN networks (which combine voice and data in a single packet switched network), to offer network controlled multimedia services.

Ever since the definition of intelligent end devices was initialised, the communication terminal was seen as an essential and irreplaceable node in the chain, since it was adapted to contain important session data. Now as developments in the technical field is moving into an IMS-based environment, the mobile communication terminal is still considered to be irreplaceable. In accordance to standardisation documents, the IMS client will be residing in the mobile communication terminal, and as such become irreplaceable. The present invention is therefore directed at proposing a split of the IMS client into two entities, a network residing part and a terminal residing part. From the network services point of view it does not need to know that the client is split into various parts. The parts can however be developed independently of this.

Figure 1:
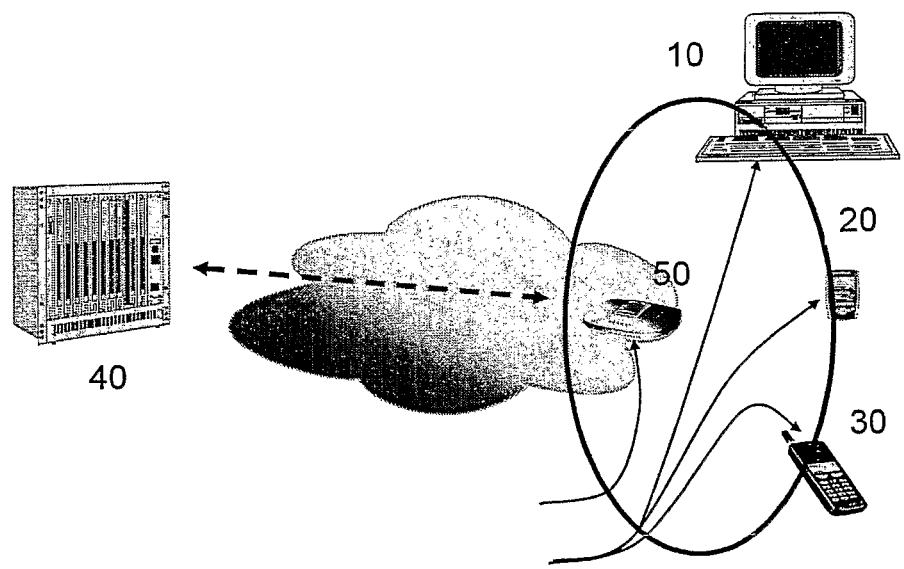
FIGS. 1 and 2 illustrate an apparatus in which the user client is distributed in accordance with the present invention. An ongoing video session is transferred from a video medium to a voice medium according to two alternative embodiments of the present invention.
Figure 2:
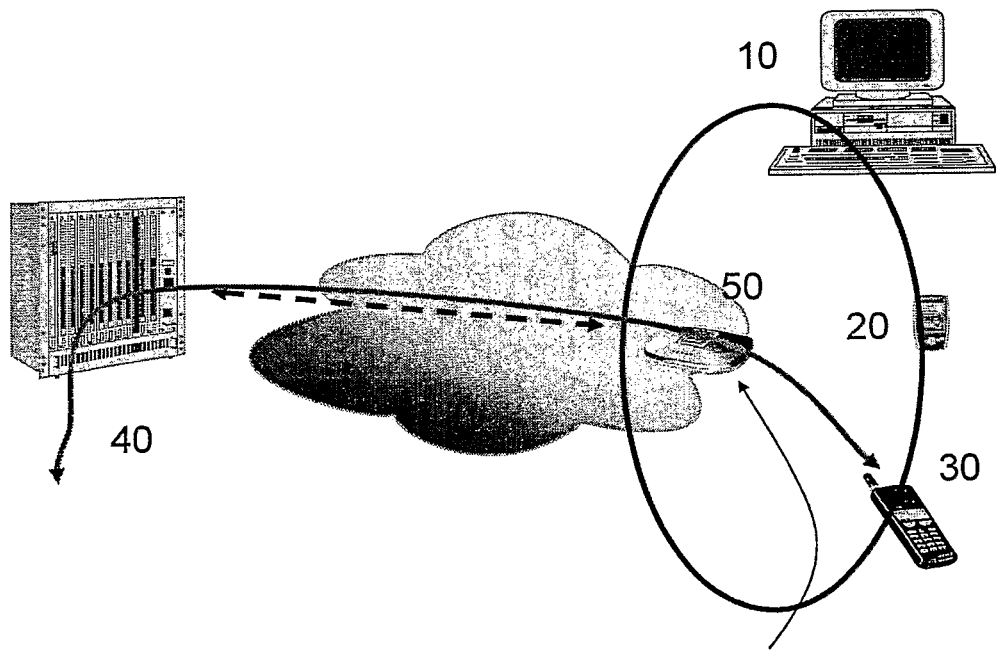

With reference to FIGS. 1 and 2, a system is disclosed which in a telecommunication system for controlling communication services between various client communication terminals in a network. Terminals in the form of a personal computer 10, a personal digital assistant 20 and a mobile phone 30 are depicted, and any other kind of mobile communication terminal is a conceivable for use. An application server 40 is hosting the core communication service, and is also responsible for providing the system with one of its links to the internet, with related possibilities for communication, or to other globally interconnecting networks.

The application server and the various mobile or stationary client communication terminals are wirelessly connected to an intermediate communication node 50, the node hosting a network residing communication part for communication with the client terminals. Both of the application server and intermediate communication node are adapted to seamlessly control transfer of communication sessions between the client terminals. This seamless transfer of communication sessions is based on the provision of a controller, which is for controlling transfer of communication sessions between the terminals. A prerequisite for being able to transfer communication sessions independently of the communication terminals is a division of the control functionality into at least two parts, one of the parts residing in the client terminal, and another part residing in the intermediate communication node.

Figure 3:
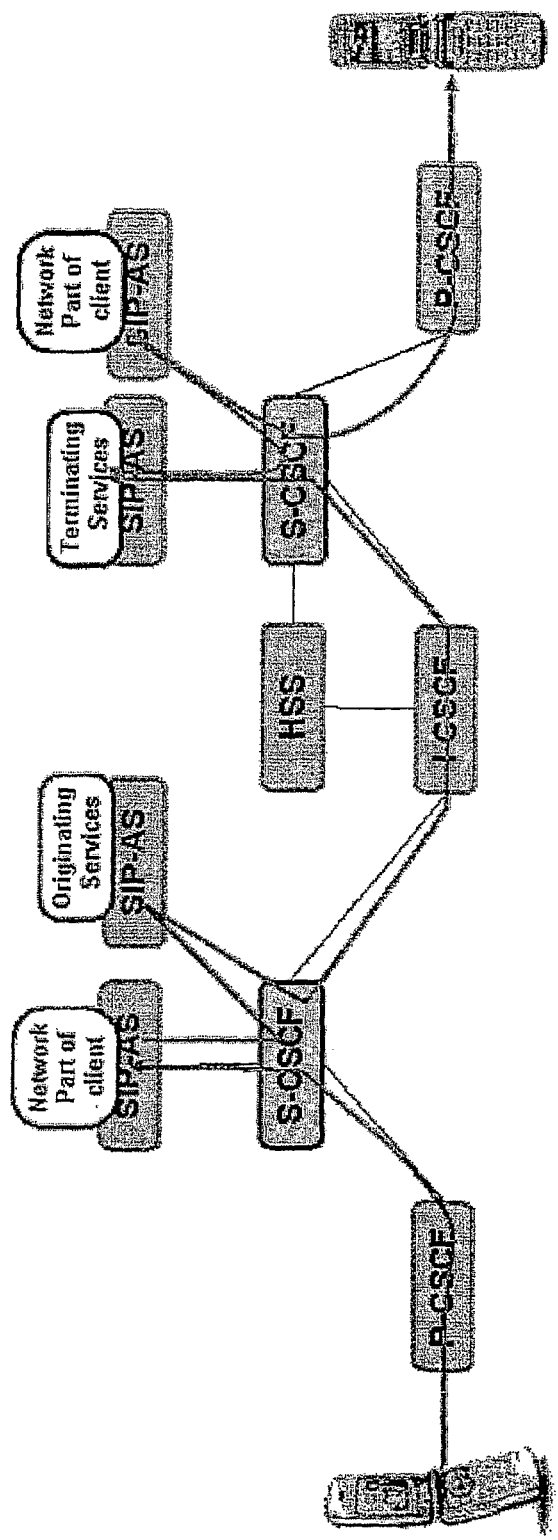
FIGS. 3 and 4 depict a scheme and an alternative scheme including entities used for transferring a session from one client terminal to another according to the present invention.
Figure 4:
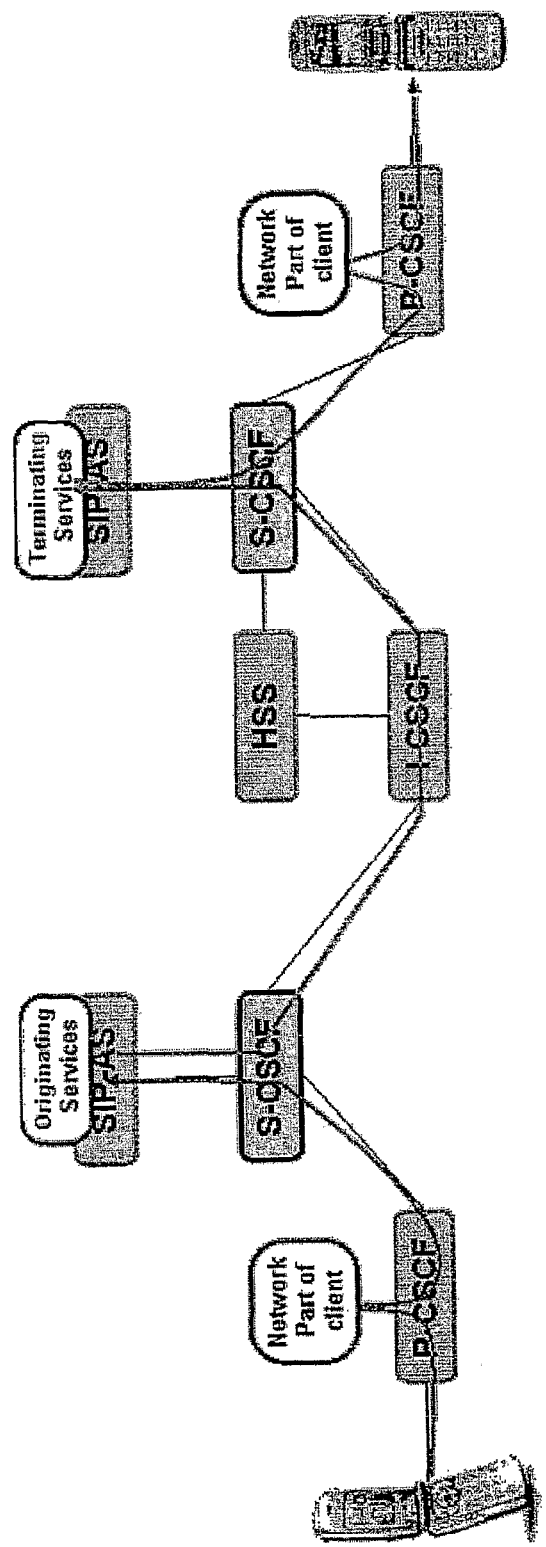

With particular reference to FIGS. 3 and 4, a description is made of entities in an IMS system according to the present invention. The HSS (Home Subscriber Server) is the master user database that supports the IMS network entities that are actually handling the calls/sessions. It contains the subscription-related information, performs authentication and authorisation of the user, and can provide information about the physical location of a user.

A P-CSCF (Proxy-CSCF) is a SIP proxy that is the first point of contact for the IMS terminal. It can be located either in the visited network or in the home network, which is applicable when the visited network is not yet IMS compliant. The terminal will discover its P-CSCF. It is assigned to a IMS terminal during registration, does not change for the duration of the registration. Some of the functions and qualities associated with a P-CSFC are described with reference to the following section.

The P-CSFC is situated on the path of all signalling messages, and can inspect every message and authenticates the user and establishes a security association with the IMS terminal. This prevents the terminal from various attacks (spoofing) and protects the privacy of the user. Moreover, the P-CSFC may also compress and decompress SIP messages, which reduces the round-trip over slow radio links and may include a PDF (Policy Decision Function), which authorises media plane resources and manages quality of service (QoS) over the media plane. The P-CSFC is used for policy decisions, lawful interception and bandwidth management.

An I-CSCF (Interrogating-CSCF) is a SIP proxy located at the edge of an administrative domain. An S-CSCF (Serving-CSCF) is the central node of the signalling plane. It is a SIP server, but performs session control as well. It is always located in the home network. The S-CSCF normally has no local storage of the user. Some of the functions and qualities associated with the S-CSFC are described with reference to the following section.

The S-CSFC handles SIP registrations, which allows it to bind the user location, e.g. the IP address of the terminal, and the SIP address and is situated on the path of all signalling messages. A result of that is the ability to inspect every message. Moreover, the S-CSFC decides to which application server the SIP message will be forwarded to in order to provide their services, and provides routing services. The S-CSFC, is also used in order to enforce the policy of the network operator. Application servers host and execute services, and interfaces with the S-CSCF using SIP. This allows third party providers an easy integration and deployment of their value added services to the IMS infrastructure.

Figure 5:
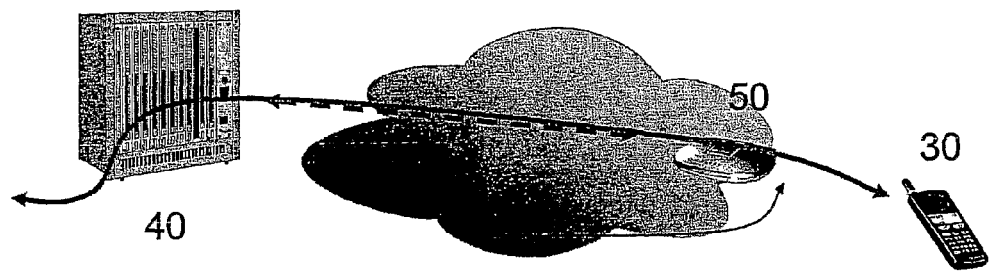
FIGS. 5, 6 and 7 are alternative embodiments different from those depicted in FIGS. 1 and 2 in that they schematically illustrate an ongoing video session being transferred from one transport medium to another for the same use. In particular, transfer from a transport medium for video to a transport medium for voice in a WiFi network is depicted, such as IMS-based telephony according to the present invention.
Figure 6:
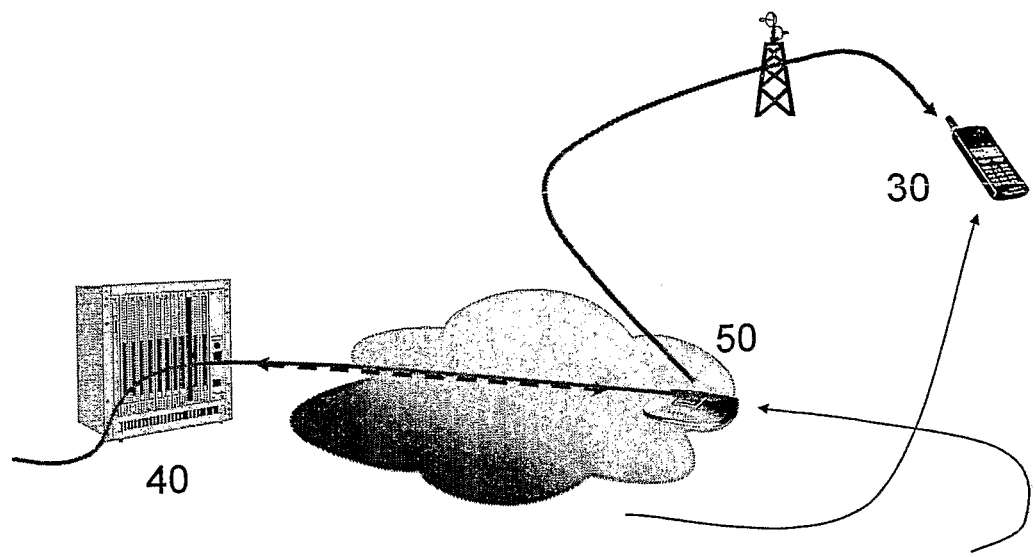
Figure 7:
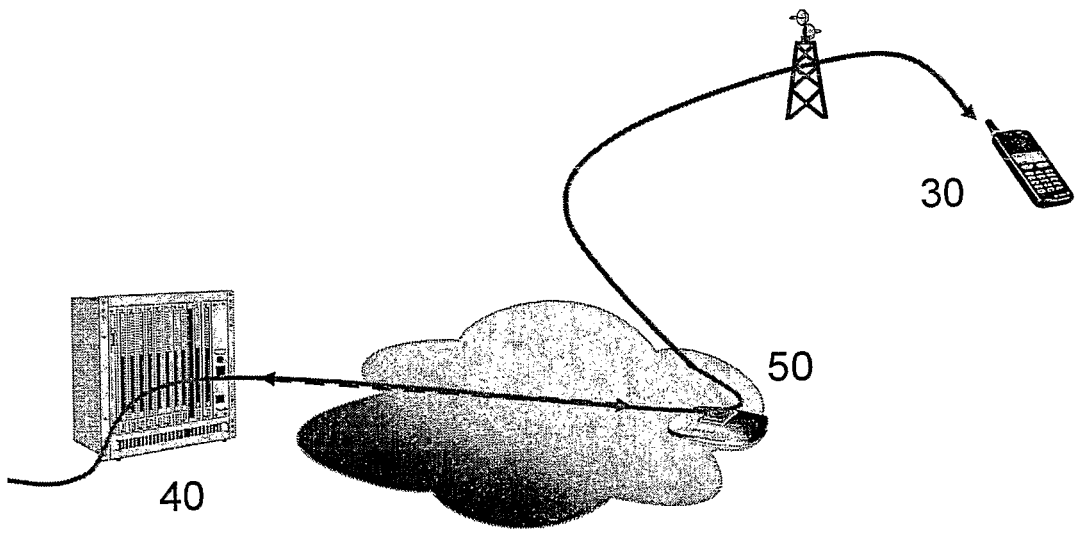

With particular reference to FIGS. 5, 6 and 7, alternative embodiments of the present invention are depicted. The embodiments are different from those depicted in FIGS. 1 and 2 in that they schematically illustrate an ongoing video session in which the voice port is transferred from a transport medium for video, including voice, to a transport medium for voice in a WiFi network, all according to the present invention. An ongoing video session is transferred from one transport medium to another medium which is suitable for use. Transfer of IMS-based telephony is only one of several conceivable communication sessions to be transferred according to the present invention. WiFi is abbreviated from the term wireless fidelity and refers to an over-the-air connection with a wireless client and a base station or between two wireless clients. WiFi allows the connection of two or more computers or mobile communication terminals without the need for physical cabling between them.

This specific components necessary for carrying out the present invention consist of a combination of so-called standard products, which are marketed and sold by the device manufacturer and as such a combination being commercially available as highly specific and proprietary as having been developed by the applicant.

It is thus the network residing part that keeps informed about which terminal client parts that are active, what capabilities they have, and what means of communication the network part has toward each terminal part.

One of the further advantages of an approach according to the present invention, and referring in particular to the enhanced capabilities of the network, is that the network part can be informed of all different terminal client parts that a user has access to. Moreover, the user is able to move from one client communication terminal to another according to his own desire. An example of this could be a user participating in a video conference which is ongoing, when the user needs to leave the room where the video conference equipment resides. This would normally lead to a break in the presently ongoing session, but according to the invention, it would be possible that the video conference session is disconnected and the voice communication content transferred to the user's mobile communication terminal. By just activating a takeover means, for example pressing a takeover button on the mobile communication terminal, the terminal part of the user client contacted the network part and informed about taking over the session. Alternatively, this would be implemented by automatic means, like when WLAN coverage ceases leading to activation of a change over from one type of communication technology to another. The network part simply said bye to the video equipment terminal client part, disconnected the video, and redirected the voice part to the mobile communication terminal. The protocol between the two parts should be partly standardised to enable interoperability, but should allow for proprietary extensions to encourage innovation.

An alternative and comparatively simple way to implement the present invention would be to make the network part of the client be situated close to the IMS application server, either as a part of the application server or as an application server of its own. Another way would be to standardise an interface to the P-CSCF, and let it execute on top of it. Particular reference is here made to FIG. 4. Information about whether a networked part shall be initiated can be received either from the HSS or from the terminal directly. The network part of client executing on top of the P-CSCF could be implemented in various ways. Another more advanced way would be to standardise the environment the network part executes in, still on top of the P-CSCF. Then it could be retrieved from the home network when the user is roaming in other networks, and executed locally for optimal network utilisation. An alternative would be to allow the P-CSCF to communicate with a client in the user's residential network, but still allow the client to use resources in the visited network, possibly upon a specific request followed by permission.

Additional use of this architecture could be to utilise the same procedures in order to bridge for the lack of support for real-time IP over GSM-GPRS. The terminal part client and the network part client could then be moving back and forth between IP over WLAN and CS voice over GSM, while the IMS based voice service would not even need not to know which kind if communication technology is used. One of the major advantages attained at by means of the present invention, and primarily from the user's perspective, will be the possibility to for the end user to operate in various networks constructed so as to enable him to seamlessly change from one particular terminal to another one, which terminal is perceived by the user as the best choice for the current task, and to do this without loosing ongoing sessions.

The aim of IMS is thus not only to provide new services but to provide all the services, current and future, that the Internet provides. In addition, users will also be able to execute all their services when roaming as well as from their home networks. To achieve these goals the IMS uses open standard IP protocols, defined by the IETF. So, a multi-media session between two IMS users, between an IMS user and a user on the Internet, and between two users on the Internet is established using exactly the same protocol. Moreover, the interfaces for service developers are also based in IP protocols. This is why the IMS truly merges the Internet with the cellular world; it uses cellular technologies to provide ubiquitous access and Internet technologies to provide appealing services.

As described from the foregoing, the network interface architecture according to all previously described embodiments of the present invention provide compatibility between IP Multimedia subsystem entities in a mobile network based on different releases of various 3GPP specifications, while promoting simplification of operations at various IMS entities, such as GGSN and PDF operations.

Abbreviations used in this throughout this document in the description, claims, summary and drawings will be explained below in Table 1.

TABLE 1

| | |
|---|---|
| AN | Access Network |
| CN | Core Network |
| CS | Circuit Switched |
| EEPROM | Electrically Erasable and Programmable Memory |
| GGSN | Gateway GPRS Support Node |
| GPRS | General Packet Radio Service |
| IMS | IP Multimedia Subsystem |
| IP | Internet Protocol |
| P-CSCF | Proxy Call and Session Control Function |
| PLMN | Public Land Mobile Network |
| PS | Packet Switched |
| RAM | Random Access Memory |
| RAN | Radio Access Network |
| SIM | Subscriber Identity Module |
| UMTS | Universal Mobile Telecommunications System |

The present invention is also useful in aiding the mobile terminal user or a related mobile terminal selection algorithm in selecting a wireless network where IMS is available. It is particularly useful during the PLMN selection phase, and make the selection faster and more user-friendly. The use of the teachings in accordance with this invention also tends to reduce the network signalling load, and the number of attempts required to register to the IMS. In accordance with the present invention, the network supplies IMS control information for the mobile terminal also as an aid in locating IMS services. This is of course particularly useful when the terminal is roaming in a visited network area.

Those skilled in the art should realise that these teachings may be implemented in various ways, other than those specifically referred to and described above. For example, other types of messages can be used to convey the IMS information, and other message formats may be employed. Thus, this invention is not intended to be limited to only the presently preferred embodiments that are disclosed above and in the drawing figures.

The invention claimed is:

1. An intermediate communication node in an Internet Protocol Multimedia Subsystem (IMS) network for controlling communication services between an application server and a plurality of client terminals in the IMS network, said intermediate communication node comprising:
   a communication interface configured to establish communication sessions between the application server and the plurality of client terminals; and
   a network part of an IMS client, wherein the network part resides in the intermediate communication node and a client part of the IMS client resides in each of the plurality of client terminals;
   wherein the network part of the IMS client is configured to establish an information interface with each client part, and is configured to utilize the information interfaces to obtain information from the client parts regarding which client parts are active, capabilities of each client part, and what types of communication sessions the IMS network has established with each client part;
   wherein the intermediate communication node is configured to transfer communication sessions between client terminals and to utilize the information obtained from the client parts to dynamically renegotiate services when service characteristics change.

2. The node according to claim 1, wherein the client terminal is a mobile communication terminal, which communicates with the network via radio signals.

3. The node according to claim 1, wherein the network part is also configured to monitor network capacity toward each client part.

4. The node according to claim 2, wherein the mobile communication terminal includes an activation means for initializing takeover of a session, the activation means being controlled based on a predetermined set of rules associated with transferring a session.

5. The node according to claim 2, wherein the mobile communication terminal includes user-activated means for initializing takeover of a session, said user-activated means causing the client part to send a command to the network part of the IMS client to take over the session.

6. The node according to claim 2, wherein the node is configured to change from one type of communication technology to another when Wireless Local Area Network (WLAN) coverage is lost.

7. A method in an Internet Protocol Multimedia Subsystem (IMS) network for controlling communication services between an application server and a plurality of client terminals in the IMS network, wherein the application server hosts a core communication service, said method comprising the steps of:
   establishing communication sessions between the application server and the client terminals through an intermediate communication node;
   dividing an IMS control functionality into two parts, wherein a client part resides in each of the client terminals, and a network part resides in the intermediate communication node, wherein the network part interfaces with each client part, and is configured to obtain information from the client parts regarding which client parts are active, capabilities of each client part, and what types of communication sessions the IMS network has established with each client part; and
   transferring, by the intermediate communication node, a communication session between a first client terminal and a second client terminal utilizing the client and network parts of the IMS control functionality and information obtained by the network part from the client parts.

8. The method according to claim 7, wherein the transferring step includes:
   receiving a message from the first client terminal by the intermediate communication node, the message indicating that the first terminal desires to take over an ongoing communication session currently established between the application server and the second client terminal; and
   initiating by the intermediate communication node in response to the message from the first client terminal, a second communication session between the application server and the first client terminal.

9. The method according to claim 7, wherein the transferring step includes ending the ongoing communication session between the application server and the second client terminal.

10. The method according to claim 7, wherein the transferring step includes maintaining the ongoing communication session between the application server and the second client terminal and joining the first client terminal in the ongoing session.

11. The node according to claim 1, wherein the intermediate communication node is configured to dynamically renegotiate a service when a user engaged in a multimedia session changes from a first client terminal having a first set of capabilities to a second client terminal having a different, second set of capabilities.

* * * * *